US009894918B2

(12) United States Patent
Ashourian et al.

(10) Patent No.: US 9,894,918 B2
(45) Date of Patent: *Feb. 20, 2018

(54) FRIED FOOD PRODUCTS HAVING REDUCED FAT CONTENT

(71) Applicant: JimmyAsh LLC, Santa Monica, CA (US)

(72) Inventors: Jamshid Ashourian, Santa Monica, CA (US); Laurie J. Keeler, Lincoln, NE (US); Durward A. Smith, Lincoln, NE (US)

(73) Assignee: JimmyAsh LLC, Bakersfield, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/613,577

(22) Filed: Feb. 4, 2015

(65) Prior Publication Data
US 2015/0150284 A1    Jun. 4, 2015

Related U.S. Application Data

(63) Continuation of application No. 12/090,842, filed as application No. PCT/US2006/038966 on Oct. 4, 2006, now Pat. No. 8,980,350.

(60) Provisional application No. 60/723,881, filed on Oct. 4, 2005.

(51) Int. Cl.
A23L 1/00      (2006.01)
A23P 20/10     (2016.01)
A23P 20/12     (2016.01)
A23L 19/18     (2016.01)

(52) U.S. Cl.
CPC .............. A23L 1/005 (2013.01); A23L 19/18 (2016.08); A23P 20/10 (2016.08); A23P 20/12 (2016.08); A23V 2002/00 (2013.01)

(58) Field of Classification Search
CPC ........ A23L 1/005; A23L 19/18; A23L 1/0047; A23L 1/217; A23P 20/10; A23P 20/12
USPC ................ 426/303, 302, 61, 94, 95, 53, 305
See application file for complete search history.

(56) References Cited

U.S. PATENT DOCUMENTS

| 2,801,083 | A |   | 7/1957  | Balassa         |           |
|-----------|---|---|---------|-----------------|-----------|
| 4,058,631 | A |   | 11/1977 | Roan            |           |
| 4,511,583 | A |   | 4/1985  | Olson et al.    |           |
| 5,059,435 | A |   | 10/1991 | Sloan et al.    |           |
| 5,126,152 | A | * | 6/1992  | Feeney          | A23L 1/217 |
|           |   |   |         |                 | 426/102   |
| 5,141,759 | A |   | 8/1992  | Sloan et al.    |           |
| 5,399,015 | A |   | 3/1995  | Zhi-Qiang et al.|           |
| 6,010,726 | A |   | 1/2000  | Evans et al.    |           |
| 6,290,999 | B1|   | 9/2001  | Gerrish et al.  |           |
| 6,536,940 | B1|   | 3/2003  | Kolb et al.     |           |
| 7,696,252 | B2|   | 4/2010  | Pashley         |           |

| 8,029,184 | B2 |   | 10/2011 | Hoogland          |        |
|-----------|----|---|---------|-------------------|--------|
| 8,267,572 | B2 |   | 9/2012  | Windhab et al.    |        |
| 8,592,351 | B2 |   | 11/2013 | Kaminsky          |        |
| 8,784,848 | B2 |   | 7/2014  | Desjardins-Lavisse|        |
| 8,815,257 | B2 |   | 8/2014  | Braksmayer et al. |        |
| 9,615,601 | B2 |   | 4/2017  | Ashourian et al.  |        |
| 2002/0004085 | A1 | * | 1/2002 | Xu et al.         | 426/52 |
| 2004/0121046 | A1 | * | 6/2004 | Dihel et al.      | 426/94 |
| 2005/0106296 | A1 | * | 5/2005 | Merrill et al.    | 426/302|
| 2009/0192068 | A1 |   | 7/2009 | Ogasawara et al.  |        |
| 2010/0310712 | A1 |   | 12/2010| Ashourian et al.  |        |
| 2015/0335047 | A1 |   | 11/2015| Ashourian         |        |
| 2017/0188614 | A1 |   | 7/2017 | Ashourian et al.  |        |

FOREIGN PATENT DOCUMENTS

| CN | 1020469 C     | 5/1993  |
|----|---------------|---------|
| CN | 203494459 U   | 5/2014  |
| EP | 1430788 A1    | 6/2004  |
| GB | 2254994 A     | 10/1992 |
| JP | 4955859 A     | 5/1974  |
| JP | 49055859 A    | 5/1974  |
| JP | 54163847 A    | 12/1979 |
| JP | 216938 A      | 1/1990  |
| JP | 690681 A      | 4/1994  |
| JP | 9206016 A     | 8/1997  |
| JP | 2003135014 A  | 5/2003  |
| JP | 2004033139 A  | 2/2004  |
| JP | 5438969 B2    | 12/2013 |
| WO | WO-0178524 A2 | 10/2001 |

(Continued)

OTHER PUBLICATIONS

"U.S. Appl. No. 12/090,842, Advisory Action dated Apr. 11, 2014", 6 pgs.
"U.S. Appl. No. 12/090,842, Examiner Interview Summary dated Apr. 11, 2014", 2 pgs.
"U.S. Appl. No. 12/090,842, Final Office Action dated Jan. 16, 2014", 12 pgs.
"U.S. Appl. No. 12/090,842, Non Final Office Action dated Mar. 28, 2013", 12 pgs.
"U.S. Appl. No. 12/090,842, Non Final Office Action dated Jun. 22, 2012", 13 pgs.

(Continued)

Primary Examiner — Emily Le
Assistant Examiner — Subbalakshmi Prakash
(74) Attorney, Agent, or Firm — Schwegman Lundberg & Woessner, P.A.

(57) ABSTRACT

Methods of making reduced-fat or fat-free fried food products, and products made according to the methods, in which food pieces are coated with an aqueous adhesion mixture including a protein, and an oil absorption minimizing agent including an edible lipophilic material, where the coating is adhered to the food pieces, in order to provide for food products having the texture, flavor, and other characteristics of conventional full-fat fried food products. According to a preferred embodiment, the aqueous adhesion mixture includes from about 65 to about 95% by weight water, from about 4 to about 25% by weight protein, from 0 to about 2% by weight hydrocolloid, and from 0 to about 10% by weight protein stabilizing agent.

21 Claims, No Drawings

(56) References Cited

FOREIGN PATENT DOCUMENTS

| WO | WO-0215715 A1 | 2/2002 |
|---|---|---|
| WO | WO-03026443 A1 | 4/2003 |
| WO | WO-2005041685 A2 | 5/2005 |
| WO | WO-2007041682 A1 | 4/2007 |
| WO | WO-2009117192 A1 | 9/2009 |
| WO | WO-2013072056 A1 | 5/2013 |
| WO | WO-2013098673 A1 | 7/2013 |
| WO | WO-2017024069 A1 | 2/2017 |

OTHER PUBLICATIONS

"U.S. Appl. No. 12/090,842, Notice of Allowance dated Nov. 4, 2014", 14 pgs.
"U.S. Appl. No. 12/090,842, Preliminary Amendment filed Apr. 18, 2008", 4 pgs.
"U.S. Appl. No. 12/090,842, filed Mar. 12, 2014 to Final Office Action dated Jan. 16, 2014", 13 pgs.
"U.S. Appl. No. 12/090,842, filed Jul. 16, 2014 to Final Office Action dated Jan. 16, 2014", 15 pgs.
"U.S. Appl. No. 12/090,842, filed Sep. 30, 2013 to Non Final Office Action dated Mar. 28, 2013", 17 pgs.
"U.S. Appl. No. 12/090,842, filed Dec. 21, 2012 to Non Final Office Action dated Jun. 22, 2012", 19 pgs.
"Canadian Application Serial No. 2,624,725, Office Action dated Feb. 19, 2014".
"Canadian Application Serial No. 2,624,725, Office Action dated Jun. 13, 2013", 2 pgs.
"Canadian Application Serial No. 2,624,725, Office Action dated Oct. 18, 2012", 2 pgs.
"Canadian Application Serial No. 2,624,725, Voluntary Amendment filed Dec. 4, 2014", 11 pgs.
"European Application Serial No. 06816324.5, Examination Notification Art. 94(3) dated Jun. 24, 2014", 7 pgs.
"European Application Serial No. 06816324.5, Examination Notification Art. 94(3) dated Dec. 1, 2014", 5 pgs.
"European Application Serial No. 06816324.5, Examination Notification Art. 94(3) mailed Dec. 20, 2013", 5 pgs.
"European Application Serial No. 06816324.5, Extended European Search Report dated Jul. 27, 2012", 8 pgs.
"European Application Serial No. 06816324.5, Office Action dated Jun. 25, 2013", 6 pgs.
"European Application Serial No. 06816324.5, Office Action dated Aug. 14, 2012", 1 pg.
"Indian Application Serial No. 3050/DELNP/2008, First Examiner Report dated Aug. 29, 2013", 3 pgs.
"International Application Serial No. PCT/US2006/038966, International Preliminary Report on Patentability dated Jun. 28, 2007", 10 pgs.
"International Application Serial No. PCT/US2006/038966, International Search Report dated Jan. 19, 2007", 1 pg.
"International Application Serial No. PCT/US2006/038966, Written Opinion dated Jan. 19, 2007", 3 pgs.
"Israel Application Serial No. 190606, Office Action dated Jan. 25, 2011", 1 pg.
"Israel Application Serial No. 190606, Office Action dated Feb. 11, 2013", 2 pgs.
"Israel Application Serial No. 190606, Office Action dated Jul. 9, 2014", 2 pgs.
"Japanese Application Serial No. 2008-5344681, Office Action dated Jun. 19, 2012", w/English translation, 8 pgs.
"Japanese Application Serial No. 2008-534681, Office Action dated Apr. 30, 2013", w/English Translation, 8 pgs.
"Japanese Application Serial No. 2008/534681, Office Action dated Jul. 12, 2011", w/English translation, 9 pgs.
"Japanese Application Serial No. 2012-277083, Office Action dated Jun. 17, 2014", W/ English Tranlation, 12 pgs.
"Japanese Application Serial No. 2012-277083, Voluntary Amendment filed Jan. 17, 2013", w/English translation, 7 pgs.
"Mexican Application Serial No. MX/a/2008/004595, Office Action dated Jan. 16, 2014", 2 pgs.
"Mexican Application Serial No. MX/a/2008/004595, Office Action dated Jul. 18, 2013", 2 pgs.
"Mexican Application Serial No. MX/a/2008/004595, Office Action dated Aug. 4, 2014", 6 pgs.
"Mexican Application Serial No. MX/a/2008/004595, Response filed Oct. 1, 2013 to Office Action dated Jul. 18, 2013", 1 pg.
"Modification of Physical and Barrier Properties of Edible Wheat Gluten-Based Films", Cereal Chem, vol. 70, (Jan. 1993), 426-429.
"Science of Rice", Asakura Publishing Co., Ltd., First printing 4th issue, (Sep. 10, 1998), 21, 34-36.
"Science of Wheat", Asakura Publishing Co. Ltd., irst printing 3rd issue,, (Apr. 10, 1998), 97-100.
"Updated Frozen Food Dictionary", Asakura Publishing Co. Ltd., First printing 5th issue, See FIG. 5.2, 5.1.2e Heating Process, 5.1.3b Anti-bacterial growth in a process, FIG. 5.4, (Oct. 25, 1994), 150-165.
Buffo, Roberto A, et al., "Chapter 17: Edible films and coatings from plant origin proteins", Innovation in Food Packaging, (2005), 277-300.
Guilbert, Stephane, et al., "Chapter 16: Agro-polymers for edible and biodegradable films: review of agricultural polymeric materials, physical and mechanical characteristics", Innovations in Food Packaging, (2005), 263-276.
Isabelle, Braccini, et al., "Molecular Basis of Ca 2+—Induced Gelation in Alginates and Pectins: The Egg-Box Model Revisited", Biomacromolecules, vol. 2, (Dec. 2001), 1089-1096.
Krochta, J. M, et al., "Edible and biodegradable polymer films: challenges and opportunities", Food Technology, 51(2), (1997), 61-74.
Mohamed, Suhaila, et al., "Food Components Affecting the Oil Absorption and Crispness of Fried Batter", J Sci Food Agric, vol. 78, (1998), 39-45.
Nussinovitch, A., "Chapter 9: Hydrocolloids in the Production of Special Textures", Water-Soluble Polymer Applications in Foods, Blackwell Science Ltd, (Apr. 9, 2003), 196-206.
Nussinovitch, A., "Hydrocolloid coating of foods: a review", Leatherhead Food RA Food Industry Journal, 1(3), (1998), 174-188.
Olewnik, M, et al., "Factors Influencing Wheat Flour Performance in Batter Systems", Cereal Foods World, vol. 38, No. 9, (1993), 679-684.
Rayner, M, et al., "Development and application of soy-protein films to reduce fat intake in deep-fried foods", Journal of the Science of Food and Agriculture, vol. 80, (2000), 777-782.
Salvador, A, et al., "Effect of the addition of different ingredients on the characteristics of a batter coating for fried seafood prepared without a pre-frying step", Food Hydrocolloids, vol. 19, No. 4, (Jun. 2005), 703-708.
Shih, F, et al., "Oil Uptake Properties of Fried Batters from Rice Flour", J. Agric. Food Chern., vol. 47, (1999), 1611-1615.
Shih, F., et al., "Preparation and Characterization of Low Oil Uptake Rice Cake Donuts", Cereal Chemistry, 79(5), (Sep. 2002), 745-748.
"U.S. Appl. No. 12/090,842, Supplemental Amendment filed Aug. 7, 2014", 8 pgs.
"European Application Serial. No. 06816324.5, Response filed May 30, 2015 to Examination Notification Art. 94(3) dated Dec. 1, 2014", 6 pgs.
"Israel Application Serial. No. 190606, Response filed Mar. 19, 2015 to Office Action dated Jul. 9, 2014", W/ English Claims, 7 pgs.
"Mexican Application Serial No. MX/a/2008/004595, Response filed Jan. 7, 2015 to Office Action dated Jan. 16, 2014", W/ English Claims, 17 pgs.
"Mexican Application Serial No. MX/a/2008/004595, Response filed Jun. 25, 2015 to Office Action dated Feb. 18, 2015", 8 pgs.
"U.S. Appl. No. 14/816,784, filed Feb. 25, 2016 to Non-Final Office Action dated Nov. 25, 2015", 15 pgs.
"U.S. Appl. No. 14/816,784, Supplemental Amendment filed Apr. 7, 2016", 7 pgs.
"DynaShear™", ADMIX Advanced Mixing Technologies, (2001), 6 pgs.
"European Application Serial No. 06816324.5, Communication Pursuant to Article 94(3) dated Mar. 4, 2016", 6 pgs.

(56) References Cited

OTHER PUBLICATIONS

"European Application Serial No. 06816324.5, Response filed Feb. 3, 2016 to Communication Pursuant to Article 94(3) dated Oct. 16, 2015", 14 pgs.

"Israel Application Serial No. 190606, Office Action dated Feb. 16, 2016", 2 pgs.

"Israeli Application Serial No. 190606, Voluntary Amendment Feb. 15, 2016", with English translation of claims, 6 pgs.

"Mexican Application Serial No. MX/a/2008/004595, Voluntary Amendment filed Aug. 6, 2015", 10 pgs.

"U.S. Appl. No. 14/816,784, Non-Final Office Action dated Nov. 25, 2015", 33 pgs.

"Canadian Application Serial No. 2,624,725, Office Action dated Apr. 10, 2015", 4 pgs.

"Canadian Application Serial No. 2,624,725, Response filed Oct. 13, 2015, to Office Action dated Apr. 10, 2015", 8 pgs.

"European Application Serial No. 06816324.5, Communication Pursuant to Article 94(3) dated Oct. 16, 2015", 7 pgs.

"Israel Application Serial No. 190606, Office Action dated Feb. 15, 2016", 8 pgs.

U.S. Appl. No. 14/816,784, filed Aug. 3, 2015, Process for the Controlled Introduction of Oil Into Food Products.

"U.S. Appl. No. 14/816,784, Final Office Action dated Jul. 11, 2016", 34 pgs, Jul. 11, 2016.

"U.S. Appl. No. 14/816,784, filed Sep 13, 2016 to Non Final Office Action dated Jul. 11, 2016", 9 pgs, Sep. 12, 2016.

"Canadian Application Serial No. 2,908,275, Office Action dated Aug. 16, 2016", 4 pgs, Jun. 16, 2016.

"Crisp Coat UC", [Online] Retrieved from the Internet: <http://www.modernistpantry.com/crisp-coat-us.html>, (Jun. 30, 2016).

"European Application Serial No. 06816324.5, Response filed Jun. 27, 2016 to Communication Pursuant to Article 94(3) dated Mar. 4, 2016", 11 pgs, Mar. 4, 2016.

"Israel Application Serial No. 190606, Response filed Jun. 15, 2016 to Office Action dated Feb. 16, 2016", with English translation of claims, 77 pgs, Feb. 6, 2016.

"U.S. Appl. No. 14/816,784, Notice of Allowance dated Dec. 2, 2016", 8 pgs.

"Canadian Application Serial No. 2,908,275, Response filed Feb. 14, 2017 to Office Action dated Aug. 16, 2016", 14 pgs.

"European Application Serial No. 06816324.5, Communication Pursuant to Article 94(3) EPC dated Sep. 30, 2016", 5 pgs.

"European Application Serial No. 06816324.5, Response filed to Communication Pursuant to Article 94(3) EPC dated Sep. 30, 2016", 61 pgs.

"International Application Serial. No. PCT/US2016/045415, International Search Report dated Oct. 10, 2016", 5 pgs.

"International Application Serial No. PCT/US2016/045415, Written Opinion dated Oct. 10, 2016", 5 pgs.

U.S. Appl. No. 15/465,258, filed Mar. 21, 2017, Process for the Controlled Introduction of Oil Into Food Products.

"U.S. Appl. No. 15/465,258, Non Final Office Action dated May 2, 2017", 5 pgs.

"U.S. Appl. No. 15/465,258, Notice of Allowance dated Aug. 22, 2017", 8 pgs.

"U.S. Appl. No. 15/465,258, filed Jul. 26, 2017 to Non Final Office Action dated May 2, 2017", 6 pgs.

"Canadian Application Serial No. 2,908,275, Office Action dated Apr. 19, 2017", 5 pgs.

"European Application Serial No. 06816324.5, Communication Pursuant to Article 94(3) EPC dated Feb. 14, 2017", 3 pgs.

"European Application Serial No. 06816324.5, Response filed Jun. 12, 2017 to Communication Pursuant to Article 94(3) EPC dated Feb. 14, 2017", 27 pg.

"Mexican Application Serial No. MX/a/2015/016127, Office Action dated Jun. 13, 2017", (W/ English Translation), 12 pgs.

"Mexican Application Serial No. MX/a/2015/016127, Response Filed Aug. 14, 2017 to Office Action dated Jun. 13, 2017", (W/ English Claims), 14 pgs.

"Canadian Application Serial No. 2,908,275, filed Oct. 17, 2017 to Office Action dated Apr. 19, 2017", 7 pgs.

\* cited by examiner

FRIED FOOD PRODUCTS HAVING REDUCED FAT CONTENT

The present application is a continuation of a U.S. application Ser. No. 12/090,842, filed Aug. 2, 2010, which is a U.S. National Stage application under 35 U.S.C. § 371 of International Application No. PCT/US2006/038966, filed Oct. 4, 2006 and published as WO2007/041682A1 on Apr. 12, 2007, which claims the benefit and priority of U.S. Provisional Application Ser. No. 60/723,881, filed Oct. 4, 2005, which are incorporated herein by reference in their entireties.

BACKGROUND OF THE INVENTION

1. Field of the Invention

The present invention relates generally to methods of making reduced-fat fried food products, and products made according to the methods, in which food pieces are coated with an aqueous adhesion mixture including a protein and an oil absorption minimizing agent including an edible lipophobic material, to provide for fried food products having the texture, flavor, and other characteristics of conventional full-fat products, particularly food products that are typically prepared by immersion frying.

2. Description of the Related Art

Products having reduced fat/oil content are known to the market, but have experienced limited acceptance by the general consumer. Increased consumer awareness and interest in health concerns related to obesity and reduced fat diets have increased the demand for foods that are organoleptically similar to high-fat fried foods in texture, flavor, and appearance, but do not contain high levels of fat/oil.

Sloan et al. (U.S. Pat. Nos. 5,059,435 and 5,141,759) disclose a process for preparing frozen, coated potatoes wherein blanched, partially-dehydrated potatoes are coated with an aqueous starch slurry comprising modified ungelatinized potato starch, ungelatinized corn starch, rice flour and other optional ingredients.

Rogols et al. (U.S. Pat. No. 6,022,569) disclose a process in which blanched potato pieces are dried, coated with a slurry of starch and rice flour, and subsequently fried by immersion in hot oil.

Both Sloan et al. and Rogols et al. teach coating processes to enhance the holding quality of the ready to consume product, to improve the acceptability of the finished product by increasing the crispness of the outer surface and to maintain the tenderness of the interior of the cut potato. In particular, the potato starch and corn starch are each said to contribute crispness to the coating. Because they are not gelatinized prior to the parfrying step, the coatings are said to decrease clumping of the strips during processing. The rice flour is said to provide tenderness in the finished product.

Yuan et al. (U.S. Pat. No. 4,283,425) disclose a process for preparing potato chips, where the chips have an added fat content of about 10%. After an optional soaking step, the chips are prepared by coating the raw potato chips with globular proteins that may be derived from animal or vegetable sources, such as egg albumin, sodium caseinate, and soy protein. Optionally, a layer of edible oil may be applied to the chips on top of the protein coating. The coated chips are then cooked using a microwave.

Olson (U.S. Pat. No. 4,511,583) discloses a process in which potato strips are dipped in a polymer solution, drained, dried, and fried.

Prosise (U.S. Pat. No. 4,917,908) discloses reduced-fat, french-fried potato products and a process for preparing same by coating potato pieces with polyvinylpyrrolidone.

Feeney et al. (U.S. Pat. No. 5,217,736) disclose a method of coating food products with a protein latex material including certain hydrophobic protein materials, oil, and other materials. In one embodiment, pectin is added to reduce fat/oil adsorption by potato products when fried.

Greenway et al. (U.S. Pat. No. 5,952,026) disclose a process for preparing potato chips in which potato slices having a thickness of from about 1 to about 3 mm are heated in a microwave oven at high intensity, where the chip is subjected to periodic heating followed by periodic cooling, until the potato chip has flavor, color, and crispness similar to that of a deep fried potato chip. Optionally, before the cooking step is carried out, the chips may be coated with a non-globular protein coating including salt, non-globular proteins, flavorants, spices, and/or vitamin additives.

Gerrish et al. (U.S. Pat. No. 6,290,999) disclose a method of coating food products with a gel consisting of a hydrocolloid and a cross-linking agent including polyvalent cations to impede the penetration of oil, thereby reducing the oil concentration in the food products.

Despite the many advances in the preparation of fried food products, there nevertheless remains a need for improvements to these products, and the processes for making them, characterized by improved crispness, mouth feel and flavor properties, reduction of fat content and overall improvement in nutritional profile, including minimization of exposure to conditions that can result in the formation of potentially deleterious by-products, all resulting from processes that are feasible, efficient, manageable, and are practically and economically scaleable for production at output levels necessary for product commercialization in an adequately fuel efficient production environment. There is also a need for new coatings, batters, breadings, dried outer layers and dusts characterized by improved crispness and flavor properties, and reduced fat/oil absorption/uptake. There is a further need for reducing reliance upon conventional deep frying processes that traditionally have been used for the production of full-fat and some reduced-fat foods, and controlling the amount of fat in provided in such products.

SUMMARY OF THE INVENTION

One aspect of the present invention is a method for preparing reduced-fat fried food products.

A first embodiment of the present invention is directed to a method of making a coated food product, including the steps of providing a plurality of food pieces, coating the food pieces with an aqueous adhesion mixture including a protein and an oil absorption minimizing agent including an edible lipophobic material, and adhering the coating to the food pieces. According to further embodiments, reduced-fat food products are made by cooking the coated food products by methods such as microwaving, baking, drying, irradiating, or frying.

According to a second embodiment of the present invention, a coated food product is provided that includes a plurality of food pieces and a coating provided on the food pieces including a protein and an oil absorption minimizing agent including an edible lipophobic material, where the coating reduces fat absorption by the coated food pieces upon cooking in an oil, as compared to food pieces without the coating. According to further embodiments, the coated food product may be provided in frozen form ready for subsequent cooking, or may be provided as a cooked, reduced-fat food.

According to a third embodiment of the present invention, a fried, reduced-fat, coated food is provided that includes a food piece having outer surfaces coated with an aqueous adhesion mixture, the aqueous adhesion mixture including sufficient proteins to form a sticky coating that adheres to the outer surfaces and being sufficiently sticky to adhere to a plurality of particles of an oil absorption minimizing agent, and an oil absorption minimizing agent including a sufficient amount of an edible lipophobic material to repel oil when the food pieces is immersed in hot oil and fried.

According to a fourth embodiment of the present invention, a food product is prepared by a process that includes the steps of a) cutting a food product into a plurality of pieces each having a plurality of food surfaces; b) coating the plurality of food pieces with an aqueous mixture including from about 70 to about 95% by weight water, from about 0 to about 30% by weight protein, from about 0 to about 5% by weight pectin and from about 0.01 to 1.0% by weight of $CaCl_2$; c) dusting the plurality of coated food pieces with pre-gelatined rice flour; and d) cooking the coated food pieces.

According to particularly preferred embodiments, the process for preparing the fried food product further includes one or both of the steps of 1) exposing a portion of the plurality of food surfaces to an aqueous enzyme solution containing an effective amount of an active enzyme to reduce the amount of starch on the surfaces exposed to the aqueous enzyme solution, and 2) blanching the plurality of food pieces. According to further embodiments, reduced-fat food products are made by cooking the coated food products by methods such as microwaving, baking, drying, irradiating (infrared), or frying.

According to a fifth embodiment of the present invention, a process for preparing a frozen, pre-treated food product, includes the steps of a) providing a plurality of pieces of a food product, the food pieces having outer surfaces; b) coating the pre-treated plurality of food pieces with an aqueous adhesion mixture, the mixture including hydrocolloid protein; c) dusting the surfaces with pre-gelatinized rice flour; d) partially drying the resulting coated, dusted food pieces; and e) freezing the final product for storage before final preparation.

According to particularly preferred embodiments, the process for preparing the frozen, pre-treated food product also includes one or both of the steps of 1) pretreating the plurality of food pieces by exposing the outer surfaces of the plurality of raw food pieces to an active enzyme, and 2) blanching the plurality of pretreated food pieces. According to additional preferred embodiments, the aqueous adhesion mixture includes from about 65 to about 95% by weight water, from about 4 to about 25% by weight protein, from about 0 to about 2% by weight hydrocolloid and from about 0 to about 10% by weight protein stabilizing agent.

Additional features of the invention can be understood in reference to the accompanying descriptive matter in which there is illustrated and described preferred embodiments of the present invention.

DESCRIPTION OF THE PREFERRED EMBODIMENTS

In preferred embodiments, the present invention provides a reduced-fat fried food product processed in such a manner so as to provide a plurality of food pieces that have a taste, texture and/or appearance of conventionally-produced products made by a process including a step in which the food pieces are fried in oil (typically at temperatures of greater than about 300° F.).

Surprisingly, the present invention has been found to retain the desired high quality, flavor, texture, appearance and consumer acceptability of high-fat snacks and food products, through certain desirable treatment of the raw materials and subsequent baking under conditions that eliminates, optionally minimizes, and/or controls the amount of contact with fats, such as oils, and limit the potential for producing potentially deleterious by-products.

It has been found that an unexpected reduction in fat/oil uptake can be obtained through a preferred process that combines coating the food pieces with a composition including an aqueous adhesion mixture, preferably in the form of a film-forming slurry, and an oil absorption minimizing agent, preferably a fat repelling substance in the form of a coating/dusting, of from about 0.5% by weight to about 5% by weight, preferably about 1% by weight to about 3% by weight, which is preferably pre-gelatinized rice flour. It has been found that the use of aqueous adhesion mixtures containing pectin and/or protein in combination with pre-gelatinized rice flour provides surprisingly improved properties to the coated food pieces.

The aqueous adhesion mixture may include a wide variety of proteins, hydrocolloids, and protein stabilizing agents. The oil absorption minimizing agent may include all types of flours and starches known to the art including, but not limited to, modified, unmodified and derivative starches including rice flour, rice starch, potato flour, wheat starch, oat flour, oat starch, corn flour, corn starch, and tapioca starch, so long as they are effective to minimize oil absorption during oil immersion cooking. According to one aspect of the invention pre-gelatinized rice flour is preferred for use. According to another aspect of the invention, high amylopectin and/or high amylose rice flour is particularly preferred in the pre-gelatinized rice flour. This oil absorption minimizing agent is effective when applied to the surface of the products before a batter is applied and is also effective when added to the surface of the batter. The oil absorption minimizing agent is also effective in lowering fat content when added as a component to the batter/coating mixture, or as a coating provided on the outer surface of a batter/coating layer.

Also, it has been found that unexpected reduction in acrylamide formation can be obtained in a food batter/breading/coating composition by utilizing an aqueous film-forming slurry comprised of hydrocolloids and proteins having a solids content comprising hydrocolloid and/or protein of from about 1% to about 10% pectin and/or protein.

Surprisingly, in preferred embodiments, the compositions and methods of the present invention have been found to reduce the oil/fat content in the coated foods of the present invention, while retaining high quality, flavor, texture, appearance, and consumer. acceptability. In preferred embodiments, this is accomplished by any single step, any combination of single steps, or all of the following steps: enzymatic pre-treatment of the raw materials; application of a cation either during a pre-treatment, during blanching, during a further treatment following blanching, and/or as a protein stabilizer in the aqueous adhesion mixture; coating with an aqueous adhesion mixture preferably further containing hydrocolloids and preferably protein stabilizers; a topical application of oil absorption minimizing agent followed by partial drying, partial baking, or partial frying; and freezing, packaging as a refrigerated product, or aseptically packaging the coated food product for cooking at a later time.

This present process allows regular frying oil and equipment to be used to prepare the present products for consumption, and alternatively allows for even lower fat/oil content in the prepared food products when processed using conventional, convection, impingement, microwave, or radiation (infrared) ovens.

The present invention further provides processes for preparing a frozen or refrigerated food product with a film-forming coating on the outer surface, which includes: cutting the raw food, preferably potatoes; treating the raw food with enzymes and/or cations; blanching the food; coating the food with the aqueous adhesion mixture of the present invention; dusting the coated food with the oil absorption minimizing agent of the present invention; partially drying, partial baking, or partial frying of the coated/dusted food; and cooling/freezing the food for sale as refrigerated or frozen products.

1. Reduced-Fat Fried Food Products

According to one embodiment of the present invention, a coated food product is provided that comprises a plurality of food pieces; and a coating provided on the food pieces comprising a protein and an oil absorption minimizing agent comprising an edible lipophobic material, wherein the coating reduces fat absorption by the coated food pieces upon frying in an oil, as compared to food pieces without the coating.

According to another embodiment of the present invention, a fried, reduced-fat, coated food is provided that includes a food piece having outer surfaces coated with an aqueous adhesion mixture, the aqueous adhesion mixture including sufficient proteins to form a sticky coating that adheres to the outer surfaces and being sufficiently sticky to adhere to a plurality of particles of an oil absorption minimizing agent, and an oil absorption minimizing agent including a sufficient amount of an edible lipophobic material to repel oil when the food pieces is immersed in hot oil and fried.

According to particularly preferred embodiments, the aqueous adhesion mixture includes from about 65 to about 95% by weight water, from about 4 to about 25% by weight protein, from about 0 to about 2% by weight hydrocolloid and from about 0 to about 10% by weight protein stabilizing agent.

A. Food Pieces.

In accordance with the present invention, the term "food pieces" is intended to include substantially any foods. Preferably, the food pieces are cut or shaped food pieces that can be shaped or reshaped directly from their raw state. Presently preferred foods include potato, beet, pumpkin, tomato, mushroom, zucchini, carrot, eggplant, apple, pear, bananas, rutabaga, plantain, taro, okra, onion, parsnip, yam, sweet potato, yucca, papaya, mango, pineapple, and the like. These foods include pureed, sliced, diced, milled, grinded, powdered, or pulverized fruits, vegetables, legumes, nuts, seeds and the like, including products such as beans, rice, corn, wheat and the like. Singly or in combinations, the aforementioned products and ingredients can be manipulated to form sheets, slices or pieces of food composition through extrusion or sheeting of a prepared dough or mixture and the like. The dough or mixture thus formed then can be extruded or cut into any desired shapes. There are many variations on this basic procedure for manipulating flour or dough into a shape suitable for the present process. (For example, see U.S. Pat. No. 3,600,193 (mixing corn flour with seasonings); U.S. Pat. No. 3,922,370 (mixing water, rice and rice flour); and U.S. Pat. No. 3,348,950 (mixing corn, sucrose, water, and corn grits), each of which is hereby incorporated by reference.

Preferred food pieces in accordance with the present invention are vegetables, and particularly preferred vegetables are potatoes, which may be prepared using the methods of the present invention to form french fries, hash browns, or any of a number of potato products that are traditionally prepared by frying. The potato substrate may be farm-grown potatoes (e.g. raw potatoes) of any variety. Such varieties include, but are not limited to, Bintje, Russet Burbank, Yukon Gold, Kennebec, Norchip, Atlantic, Shepody, Sebago, Red Pontiac, Red Warba, Irish Cobbler "BC", Norgold Russet "BC", Norland, Atlantic, White Rose, Superior, Centennial Russet, Keswick "NB 1", Green Mountain, La Soda, Red La Rouge, Red Nordland, Red Bliss, Yellow Finnish, Ruby Crescent, and Australian Crescent, Russian Blue, Peruvian Blue, Superior, Katandin, and sweet potato varieties such as Beauregard, Jewel, Nemagold, Centennial, Excel, Regal, Southern Delite (Hernandez), Vardaman, Travis, White Delight, Sumor, Nancy Hall, Picadita, Campeon, Star Leaf/Boniato, Japanese, Chinese, and Okinawan Purple and the like.

The present invention also encompasses foods such as fish, poultry, beef, pork, lamb, and other animal products. Presently preferred examples of foods that may be produced in accordance with the methods of the invention include animal products such as fried chicken, chicken nuggets, chicken strips, fish fillets, fish nuggets, breaded steak patties, fried egg products (e.g., egg products for use in breakfast sandwiches/muffins), and the like. Also included are cheeses, as well as foods that can designed to have the texture or appearance of various animal products, such as tofu. Further included are various processed foods, and it is envisioned that foods such as donuts, toaster pastries, etc., may be prepared in accordance with the methods set forth herein. It should be noted that the coatings of the present invention may be beneficially incorporated into a batter or breading that is provided on a food that is traditionally prepared by coating with batter or breading, or as a separate coating provided on top of a batter or breading layer that forms part of the food.

B. Aqueous Adhesion Mixture.

The aqueous adhesion mixture of the present invention includes a protein, and preferably also includes a hydrocolloid. A protein stabilizer may also optionally be included in the aqueous adhesion mixture.

The protein provided in the aqueous adhesion mixture may be selected from various vegetable and animal sources, including, but not limited to, rice proteins, corn proteins, egg proteins, milk proteins, soy proteins, and wheat proteins. Such proteins are capable of interacting with any hydrocolloids that are provided in the aqueous adhesion mixture in the coating compositions to increase film strength, provide structure, improve crispness and prolong holding of crispness. The hydrophilic nature of some proteins is desirable because this can function as a lipid barrier. Rice protein, wheat protein and/or egg white albumin are used in preferred embodiments.

The hydrocolloid that may be provided in the aqueous adhesion mixture include natural gumtree extrudates/extracts; seed, root or seaweed extracts; pectins; gelatins; starches; microbial fermentation gums (e.g. xanthan, dextran, and the like); modified gum or cellulose derivatives; starch derivatives; alginates; synthetic chemical gums; polyvinylalcohol; and the like. High ester pectins are preferred for use as hydrocolloids in accordance with some embodiments of the present invention, and are presently believed to be best-suited for stabilizing proteins in the aqueous adhesion mixture.

Protein stabilizing agents are compounds that are believed to minimize the disassociation of proteins in the underlying coating on a food piece in amounts sufficient to be effective to minimize such disassociation. When included in the aqueous adhesion mixture, preferred protein stabilizing agents of the present invention include, but are not limited to, cations delivered in the form of a salt (preferably calcium delivered as calcium chloride ($CaCl_2$)), starches, gums, proteins, and the like, depending upon specific the proteins in the underlying coating for which stabilization is sought and the properties of such protein. Other ingredients that are suitable protein stabilizing agents include carbohydrate components such as methyl cellulose, hydroxypropyl methyl cellulose, microcrystalline cellulose and the like.

Optional additional ingredients for use in the aqueous adhesion mixture of the present invention include maltodextrins, dextrins, microcrystalline cellulose, and hydrocolloids including hydroxypropyl methyl cellulose and gums including xanthan gum, guar gum and the like which are used to provide improved structure and keeping qualities to the coated products.

Suitable leavening agents such as sodium bicarbonate with or without the addition of leavening acids such as those in the group including sodium aluminum phosphate (SALP), sodium aluminum sulfate (SAS), sodium acid pyrophosphate (SAPP), dicalcium phosphate (DCP), and cream of tartar (potassium bitartrate), may also be incorporated into the aqueous adhesion mixture of the present invention to further improve the texture, flavor and cohesiveness of the oil barrier.

C. Edible Lipophobic Material.

The application of oil absorption minimizing agents or oil repelling particles to the outer surface of food pieces improves crispness, texture, and appearance. Oil absorption minimizing agents are compounds that are believed to have only limited affinity for oil and/or fat and therefore, when incorporated into the outer coating on a food piece in amounts sufficient to be effective, have a tendency to minimize the amount of oil and/or fat that a fully coated food piece will absorb, when cooked in hot oil. Preferred oil absorption minimizing agents of the present invention include, without limit, agents such as high amylose flours or starches; Hi-Maize Corn Starch corn starches; tapioca starches; potato starches and the like; other unmodified flours and starches high in amylose; modified flours and starches having high amylose content, preferably from about 70 to about 80% or more; carboxymethylcellulose, hydroxypropyl methylcellulose and the like, to the degree such agents are acceptable in foods and act as good film formers and also minimize oil absorption; preferably Pac-Star® pregelatinized rice flour, modified wheat starches such as Repel A and the like, most preferably Pac-Star® Pregelatinized Rice flour.

According to one aspect of the invention, the edible lipophobic material that is applied to the food pieces is rice flour. According a preferred aspect of the invention, the edible lipophobic material is pre-gelatinized rice flour. According to a particularly preferred aspect of the invention, high amylopectin rice flour is used as the edible lipophobic material. Pre-gelatinized rice flour particles that are lipophobic reduce the amount of oil/fat that is absorbed/adsorbed into the final product during frying. Rice flours suitable for use with the invention include long grain, medium grain, short grain or waxy rice flour. A variety of other flours and starches may optionally be used in producing the coating formulations of the invention, including but not limited to potato starch, potato flour, wheat flour, wheat starch, oat flour, oat starch, corn flour, corn starch, and the like. Such starches may be crosslinked and/or substituted by acetylation or other means.

D. Coated Food Pieces.

When provided separately on a food product, the coating consisting of the aqueous adhesion mixture and oil absorption minimizing agent is preferably of a thickness effective to reduce the oil content of the food product to the desired level, and is preferably about 25 microns to about 1.3 mm thick. According to a preferred embodiment, the coating thickness is about 0.25 mm.

The film forming coating and oil repelling particles have the potential to be effective carriers and providers of additional nutrients, flavors, colors, antioxidants, antimicrobials and the like, to enhance nutrition, taste, quality, and safety of the food products. Accordingly, the coating may optionally include one or more of these additional additives.

It is also envisioned that the coating of the present invention may be applied in addition to other coatings, such as batter or breading layers that form a part of finished food products including, without limitation, chicken strips, fried chicken, chicken nuggets, chicken patties, fish filets, fish nuggets, Salisbury steak patties, fried fruit and vegetable products of all kinds, fried egg products such as those incorporated into breakfast sandwiches and muffins, cheese products, and processed foods such as donuts, toaster pastries, and related products. In these embodiments, the coatings of the present invention may be mixed into the batter or breading layers, or may be provided on top of the batter or breading layers. Alternatively, in some embodiments the coating may be provided under the traditional batter or breading layers. When mixed into batter or breading layers, the thickness of the combined layer of breading/batter and the coating of the present invention is preferably sufficient to reduce the oil content of the food product to the desired levels, while not increasing the thickness of the normal coating in a way that interferes with the characteristics of the food product.

2. Methods for Preparing Reduced-Fat Fried Foods

In accordance with one embodiment of the present invention, a method is provided for making a coated food product, including the steps of (a) providing a plurality of cut or shaped food pieces; (b) coating the food pieces with an aqueous adhesion mixture including a protein and an oil absorption minimizing agent including an edible lipophobic material; and (c) adhering the coating to the food pieces. According to related embodiments, reduced-fat food products are made by cooking the coated food products by methods such as microwaving, baking, drying, irradiating (infrared), or frying.

In accordance with another embodiment of the present invention, a coated food product is provided that includes (a) a plurality of food pieces; and (b) a coating provided on the food pieces including a protein and an oil absorption minimizing agent including an edible lipophobic material. The coating reduces fat absorption by the coated food pieces upon frying in an oil, as compared to food pieces without the coating. According to related embodiments, the coated food product may be provided in frozen form for subsequent cooking, or may be provided as a fully or partially cooked, reduced-fat food.

In accordance with an additional embodiment of the present invention, a fried food product is prepared by a process that includes the steps of a) cutting a food product into a plurality of pieces each having a plurality of food surfaces; b) coating the plurality of food pieces with an aqueous mixture including from about 70 to about 95% by weight water, from 0 to about 30% by weight protein, from 0 to about 5% by weight pectin and from about 0.01 to 1.0% by weight of $CaCl_2$; c) dusting the plurality of coated food pieces with pre-gelatined rice flour; and d) frying the coated food pieces by immersion in hot oil. According to particularly preferred embodiments, the process may additionally include one or both of the following additional steps: 1) exposing a portion of the plurality of food surfaces to an aqueous enzyme solution containing an effective amount of an active enzyme to reduce the amount of starch on the surfaces exposed to the aqueous enzyme solution; and 2) blanching the plurality of food pieces.

In accordance with a further embodiment of the present invention, a process for preparing a frozen, pre-treated food product, includes the steps of a) cutting the food product into a plurality of food pieces having outer surfaces; b) pretreating the plurality of food pieces by exposing the outer surfaces of the plurality of raw food pieces to an active enzyme; c) blanching the plurality of pretreated food pieces; d) coating the pre-treated plurality of food pieces with an aqueous adhesion mixture, the mixture including hydrocolloid protein; e) dusting the surface with pre-gelatinized rice flour; f) partially drying the resulting coated, dusted food pieces; and g) freezing the final product for storage before final preparation.

Generally, the processes of the invention can be applied to any foods that have heretofore been prepared by frying. The format of the food can include, for example, sticks, strips, chips, crinkle cut, waffles, flakes, and the like. Diced, shredded, or chopped materials can be processed individually, or pressed into patties, bars, rounds, e.g., Tater Tots® or Tater Gems®, for further processing. The processes of the present invention may also be used to prepare home fries or fried potato squares. These processes may also be used to prepare food products that traditionally prepared by applying breadings, batters, or other coatings to the food before cooking.

A. Food Piece Preparation.

The food pieces are cut, formed, or shaped from food materials. Where the food materials are raw plant materials, the food pieces are preferably cleaned, optionally peeled, and cut. Where the food materials are potatoes, the potatoes are preferably cut into slices, sticks, or strips of a desirable size and shape for french fries and the like. After cutting, forming, or shaping, the prepared food pieces may optionally be contacted with an aqueous solution, such as a water, to remove free starch or other compounds that may be present on the surface of the food. Removing free starch is beneficial at least because it reduces the amount of enzyme present on the surface of the food pieces, and because free starch can leave a powdery appearance after the food pieces are dried. Where the food pieces are formed from animal products, the food pieces are preferably cleaned and cut, and may optionally be precooked.

B. Enzyme and/or Cation Treatment.

The prepared food pieces may be exposed to an enzyme solution or a solution including cations, more preferably a solution containing both enzymes and cations.

The enzymes to be used in the methods of the present invention may be in any form suitable for the use in question, e.g., in the form of a dry powder, agglomerated powder, or granulate, in particular a non-dusting granulate, a liquid, in particular a stabilized liquid, or a protected enzyme. Granulates and agglomerated powders may be prepared by conventional methods, e.g., by spraying the enzyme(s) onto a carrier in a fluid-bed granulator. The carrier may consist of particulate cores having a suitable particle size. The carrier may be soluble or insoluble, e.g., a salt (such as NaCl or sodium sulfate), a sugar (such as sucrose or lactose), a sugar alcohol (such as sorbitol), starch, rice, corn grits, soy, or the like. The enzymes may be contained in slow-release formulations. Methods for preparing slow-release formulations are well known in the art. Liquid enzyme preparations may, for instance, be stabilized by adding nutritionally acceptable stabilizers such as a sugar, a sugar alcohol or another polyol, and/or lactic acid or another organic acid according to established methods.

In preferred embodiments, if a blanching step is employed, the enzyme treatment is applied prior to blanching. In alternative embodiments, the enzyme treatment is applied concurrently during the blanching, or as an additional treatment after blanching.

Suitable enzymes, forms taken by the enzymes, commercial availability, etc. for use in accordance with the present invention are chosen from one or more of the enzymes listed in U.S. Pat. Nos. 4,058,631; 5,312,631; and 7,056,544, each of which is incorporated by reference herein. Preferably, the enzyme is other than a high-temperature enzyme, such as the high temperature amylase described in U.S. Pat. No. 5,441,758. However, under certain circumstances, such an enzyme may be used in accordance with the invention, and the use of a high temperature enzyme is not disclaimed herein. Preferred enzymes in accordance with the present invention include amylase, cellulase, invertase, pectinase and amyloglucosidase, with amylase being the most preferred. Preferably, the one or more enzymes is present in the solution at a concentration of about 0.1 to about 5% by weight. The enzymes are preferably used in amounts that provide at least one of the following advantages: increasing the crispness, reducing the stickiness (which aids in processing), and improving the color of the finished products.

In accordance with the invention, the enzyme solution may further comprise one or more cations, or the cations can be provided in a solution without enzymes. The term "cation-producing compound" is intended to include compounds in which cations are produced in solution via dissociation of the cation with an anion, either at ambient temperatures or with the addition of heat. Suitable cation-producing compounds in accordance with the present invention include, but are not limited to, alkali metal salts, such as lithium, sodium and/or potassium salts; alkaline earth metal salts, such as magnesium and/or calcium salts; aluminum compounds; and group VA metal compounds, such as nitrogen, phosphorous and/or bismuth compounds (e.g., ammonium). More preferred from this set of compounds are calcium salts, magnesium salts, potassium salts, aluminum compounds and nitrogen compounds, with calcium salts being the most preferred. Preferably, the one or more cations is present in the solution at a concentration of about 0.1 to about 5% by weight. More preferably, the cations are added to aqueous adhesion mixture in a concentration of at least about 0.2%, more preferably at least about 0.3%, and in particularly preferred embodiments the cation in provided in an amount that is not more than about 0.8% by weight of the solution. The cation preferably provides sufficient crosslinking to stabilize the protein, or protein-hydrocolloid matrix or mixture. Without being bound by theory, it is believed that the optional cations increase the activity of the enzymes, reducing time in the solution, and also make the cut food pieces more firm or rigid so they are easier to process. Further, cations may also decrease enzymatic browning as well as contribute to the food product's nutritional profile.

The exposure of the food pieces to the enzyme solution, optionally including cations as described above, or the cation solution without enzymes, provides various improved properties to the food product. The term "improved property" is defined herein as any property of a food product that is altered by the action of the one or more enzymes and/or cations relative to a food product in which the food pieces are not treated with such a solution. The improved property may include, but is not limited to, increased crispiness, reduced stickiness, increased firmness of the raw and/or blanched material, reduced browning from enzymatic and/or Maillard reactions, increased color brightening, increased color retention, increased color enhancement, reduced color fading, increased stiffness, increased rugged or smooth appearance, improved flavor, and reduced fat content. Many of these terms are defined more fully in U.S. Pat. No. 7,056,544, hereby incorporated by reference. The other terms are defined in accordance with their customary meaning as would be apparent to those of ordinary skill in the art.

The improved property may be determined by comparison of a food product prepared in accordance with the methods of the present invention, versus a food product prepared in accordance with prior art methods. Techniques for determining such improved properties achieved by use of the present methods are described herein. Organoleptic qualities may be evaluated using procedures well established in the food industry, and may include, for example, the use of a trained panel of sensory evaluators. Other methods could include texture analysis and comparisons such as those disclosed herein below.

Preferably, the food pieces are exposed to the enzyme solution (with or without cations), or the cation solution, for a time of about 0.5 to about 30 minutes, more preferably about 0.5 to about 15 minutes, most preferably about 0.5 to about 5 minutes. The appropriate exposure to a given enzyme for improving a specific property or properties of a food product will depend on the enzyme and cation in question. The skilled person may determine a suitable enzyme and cation exposure on the basis of methods known in the art.

In alternative embodiments, other nutrients including vitamins and minerals, such as Vitamin A, Vitamin, B6, Vitamin B12, Vitamin C, Vitamin D, Thiamin, Riboflavin, Niacin, Folic Acid, Phosphorous, Magnesium, Copper, Calcium, Zinc, Iron and the like can be added to the products of present invention either by infusing such vitamins and minerals into the food pieces in the enzyme treatment, cation treatment and/or blanching process, or in an additional step or by spraying a compound including any desired vitamins and/or minerals over the food pieces prior to or after cooking. This procedure results in a product that is nutritionally fortified and provides an opportunity to make food products that are healthier. In alternate embodiments, seasoning blends such as salt (NaCl), sugar, herb extracts, fruit extracts, vegetable extracts and the like or a combination thereof can be infused into the food product by steeping or soaking the cut food pieces with the respective salt, sugar, herbs, fruits, vegetables and the like, thereby incorporating these flavoring components into the food pieces either in the blanch water and/or by having a separate step following the blanching step in which flavors are fused into the cut food pieces. Alternately, cut food pieces may be soaked concentrated flavor extracts that are either aqueous or otherwise. In yet another embodiment, the food products of the present invention may be coated with chocolate, caramel, syrups, and coatings made from fruits or vegetables or any other similar covering, thereby creating other novel gourmet snacks that are free of, or alternatively low or high in fat.

C. Blanching.

Several embodiments of the present invention include a step whereby the food pieces are blanched, although not all products that may be produced in accordance with the methods of the present invention require a blanching step. When a blanching step is preferable or desirable, the food pieces may be blanched for a time period sufficient to achieve any or all of the following: 1) to inactivate any enzymes that naturally occur on the surface of the pieces and/or to inactivate any enzymes added during the enzyme treatment step described above; 2) to gelatinize at least a portion of the naturally occurring starches; 3) to remove excess free sugars so as to reduce Maillard browning and potential for formation of acrylamides; and 4) to improve texture and flavor. Typically, the food pieces are preferably blanched by immersion in an aqueous solution, preferably containing from about 0.5% to about 8% by weight, more preferably from about 2% to about 5% by weight, most preferably about 3% by weight of one or more cations, as defined above. In preferred embodiments, the cation-producing compounds are selected from NaCl, KCl, $MgCl_2$ and $CaCl_2$. The blanching may be conducted at a temperature of preferably from about 60° C. to about 120° C., more preferably from about 70° C. to about 100° C.

In alternate embodiments, the blanching may be conducted by exposure to steam (at ambient or higher pressures), preferably for about 30 seconds to about 10 minutes, more preferably for about 40 seconds to about 3 minutes, depending upon the amount of blanching desired. Alternatively, any known method of blanching such as microwave, Ohmic heating, super heat steam, infrared heating and the like can be used in accordance with the present invention.

The food pieces are then preferably drained or conveyed under an air curtain to remove excess water. In alternate embodiments, any known method of removing excess surface water may be employed. Salt can be added before, during or after blanching. Any salts that are suitable for use in foods may be used, but NaCl, KCl, $MgCl_2$, $CaCl_2$ and the like are preferred.

Raw, enzyme-treated food pieces can be blanched in a solution containing at least one cation such as calcium, magnesium or the like. The blanch solution can also include salts, flavoring agents, colors, desirable oils and the like that are deemed desirable in the final product. Alternatively, the blanched food piece could be dipped into a solution or dusted with a powder containing the cation(s).

D. Coating Preparation and Application.

The aqueous adhesion mixture or coating mixture may be prepared by dry blending the various solid ingredients. Water is then slowly added to the dry ingredients in an amount selected to provide an appropriate viscosity to the coating batter. The coating batter may contain from about 65 to about 95% by weight water, from about 4 to about 25% by weight protein, from about 0 to about 2% by weight hydrocolloid, and from about 0 to about 10% by weight protein stabilizing agent. According to a preferred aspect of the invention, it has been found that aqueous slurries containing from about 80 parts to about 90 parts by weight water to about 10 to about 20 parts by weight of the solid ingredients exhibit a particularly preferred viscosity for coating of the food piece. However, the solids content of the slurry may vary depending on the particular food pieces being coated, and the desired properties of the finished food product.

The method of applying the aqueous adhesion or film forming mixture to the food pieces will vary depending on the size, shape, and other characteristics of the food pieces. The application method may be any method known in the art including, without limitation, dipping, spraying, enrobing and the like. Although not necessary, multiple layers of the film forming mixture may be used. Upon application, the aqueous film forming mixture not only forms a film on the food piece, but will typically also penetrate the top layer of the food piece and preferably react with the crosslinking agent present from the pre-treatment. The amount of film forming coating/mixture applied, the depth of penetration and crosslinking is generally related to the amount of oil uptake and thus oil reduction in that the film formation prevents the oil from readily being absorbed by the food piece.

The oil absorption minimizing or oil repelling particles can be applied to the food pieces prior to the batter/coating application, creating a barrier just below the surface. This practice in some cases allows for a crispier product, with a longer hold time. According to further aspects of the invention, the oil absorption minimizing particles may be applied after the batter/coating application, or even at the same time. It has been found that an unexpected reduction in fat/oil uptake during immersion frying can be obtained by coating the surface of a food product with a fat repelling substance preferably including from about 0.5% to about 5% of pre-gelatinized (pre-gel) rice flour, more preferably from about 0.6 to about 3.0%, and most preferably from about 1.0% to about 2.5%. This fat repelling substance can be applied to the final outer surface of the products or between the product and the oil absorption minimizing agent containing batter.

E. Flash Frying.

A flash frying process may optionally be included in the process after the batter/coating application in order to eliminate the final drying/curing step, and to facilitate the individual separation of the product pieces. This flash fry process sets the batter/coating and seals moisture into the product.

In addition, the invention contemplates flash frying any of the food products prepared in accordance with the invention, which may be performed in a residential (e.g., home), retail, or commercial setting.

F. Drying/Curing.

A drying/curing step may be used after the food pieces are coated with the aqueous slurry and oil absorption minimizing agent. The drying/curing may use heat, airflow, or a combination thereof, to create a more cohesive barrier to prevent oil absorption/adsorption, and prevents the coatings on the food pieces from adhering together or being separated from the food pieces during the processing steps. The drying step may result in full or partial drying of the coated food pieces, depending on the desired processing results.

Drying can be achieved through methods such as impingement cooking and other well known methods. In one embodiment of the invention, the coating on the food pieces is dried in one or more dryers or ovens independently selected from the group consisting of forced air convection ovens, fluidized bed dryers/ovens, vibrating fluidized bed dryers/ovens, impingement dryers/ovens, pulsed fluidized bed dryers/ovens (e.g., Aero Pulse dryers), rotary dryers/ovens, rotary drum dryers/ovens, rotary spiral drum dryers/ovens, tray ovens, stationary dryers/ovens, spiral roasters/dryers (such as, for example, FMC Spiral Roto-Louvre Roaster/Dryers), microwave dryers/ovens, infrared dryers/ovens, super heat airless driers, vacuum driers, vacuum belt dryers and ohmic dryers. During this stage, the coated food pieces may be exposed to air at an air speed of about 300 to about 15,000 feet per minute.

Other equipment, such as, for example, any similar type rotary dryer or rotary drum dryer, "flash dryers", airless or superheated steam dryer and the like such as, for example, those available from Applied Chemical Technologies, Carrier Vibrating, Inc., The Dupps Company and the like, may be used in place of the dryers. Alternatively, microwave, infrared, impingement, vibrating impingement, tray oven, convection oven, industrial oven, stationary oven, fluidized bed or vibrating fluidized bed drying, vacuum drying, vacuum belt drying or the like can be employed in the process adhering the coating to the cut food pieces, each resulting in a different degree of efficiency and level of output. When applicable, any versions of the foregoing equipment described herein in relation to the various embodiments of the present invention, such as, for instances, batch or continuous processing equipment, static or vibrating equipment designs and the like may be employed.

Moisture sensing equipment such as those available from Drying Technologies, Inc. (i.e., DTI 500, DTI 5000) and the like can be installed inside the rotary dryer or the like to ensure proper conditions on an automated basis.

In preferred embodiments, the dried food pieces are then transferred to an impingement oven, a fluidized bed dryer/oven or any other similar equipment via a conveyor belt or any other conveying device or method. After moisture reduction, the resultant food products may then be cooled either at ambient or reduced temperatures, and optionally seasoned as desired and packaged for distribution, final preparation, and consumption.

G. Refrigerating/Freezing.

The coated food products may optionally be refrigerated or frozen, and then packaged and stored until such time as they are to be prepared for final consumption. According to a preferred embodiment, the coated food products are frozen and stored at a temperature below 0° F. using conventional methods.

H. Food Preparation.

In order to prepare the coated food products for final consumption, they are cooked either by frying or by baking in a microwave oven, convection oven, impingement oven, infrared oven, or similar heating apparatus. After such preparation, coated food pieces prepared according to the present invention are characterized by a crisp outer layer, a moist tender interior and improved flavor qualities. According to a preferred embodiment, the food products have an improved nutritional profile including lower fat/oil content, and/or increased calcium and protein levels.

I. Preferred Method for French Fry Production.

A particularly preferred procedure for producing french fries in accordance with the methods of the present invention is described below.

Grower Storage. Potatoes arrive at the plant for processing. During the harvest season potatoes are delivered straight from the field but during the rest of the year they are transported from storage facilities.

USDA Inspection. Samples of the unprocessed potatoes are taken to be graded and tested to determine grower payment.

Raw Receiving. Unprocessed potatoes are off-loaded from trucks and given a brief cleaning.

Peeling. Unprocessed potatoes can be washed and put in steam peelers to remove skins.

Scrubbing. The potatoes can be mechanically scrubbed to remove any remaining peel.

Specking Table. Potatoes inspected by hand for rot and disease. Cutting. Whole potatoes are cut into french-fry strips.

ADR (Automatic Defect Removal). Individual strips are inspected electronically for defects.

Shaking. Pieces that are too small or misshapen are removed from the main processing line, may be used in other products like hash browns, tater tots, etc.

Enzyme Treatment. Potato strips are placed in a enzyme/calcium solution (0.5% amylase and 1% calcium chloride solution (32% $CaCl_2$ in water)) for 2-3 minutes.

Blanching. Potato strips are blanched at 180-200° F. for 2 minutes to remove natural sugars, deactivate enzymes, and create a good texture.

Moisture Removal. Coated potato strips are put in a dryer or oven to remove moisture. (This step is optional.)

Coating. Blanched potato strips are dusted with rice flour and any optional ingredients, which may be performed before, during, or after coating with a pectin/protein/film-forming solution.

Following coating, there are two options:

Drying. Coated potato strips are put in a dryer or oven to remove moisture.

Flash Frying. After coating with batter, the potato strips are fried for a short time, 15-30 seconds at 350-400° F.

J. Analysis of Food Products.

A number of examples are provided in which samples are analyzed for moisture using the convection oven method; by measuring the weight lost as a result of heating a ground sample (e.g., 4 grams, run in triplicate) in a convection oven under controlled conditions (e.g., 100° C. for 24 hours). The percent of weight lost is reported as the percent of moisture in the sample. This "moisture method" is based upon the method, disclosed by R. P. Ruis, "Gravimetric Determination of Water by Drying and Weighing: Measuring Moisture using a Convection Oven", Current Protocols in Food Analytical Chemistry, John Wiley and Sons, 2003, pp. A1.1.1.

In these examples, samples were also analyzed for fat using a variation of the chloroform extraction method described by F. I. Shahii, "Extraction and Measurement of Total Lipids", Current Protocols in Food Analytical Chemistry, John Wiley and Sons, 2003, pp. D1.1.4.

Prior to extraction, the sample is ground in a blender.
1. Prepare a 2:1 solution of chloroform: methanol.
2. Measure 10 g of ground sample into a flask; add 50 mls of 2:1 chloroform/methanol solution.
3. Stir covered for 1 hour.
4. Pour into a clean flask through filter paper.
5. Rinse the initial flask and remaining solids into the new flask with a small amount of the 2:1 solution of chloroform: methanol.
6. Add 30-35 ml of distilled water and mix.
7. Let sit at 4° C. overnight.
8. Remove settled top layer containing water and methanol with a water aspirator and glass pipette.
9. Weigh a new round bottom flask and record.
10. Pour the remaining solution into the new flask through a filter, pass the remaining layer of chloroform (and fat) over sodium sulfate to remove any remaining water. Wash all of the fat into the flask using additional chloroform.
11. Using a rotovap at 50 C/80 rpm, remove (evaporate) the remaining chloroform.
12. Place flask in the chemical fume hood overnight to completely evaporate any remaining chloroform.
13. Weigh flask after drying is complete, record and determine the amount of fat.

EXAMPLES

Particularly preferred embodiments of the present invention will now be described with respect to the following non-limiting examples.

Example 1—French Fries

Pretreatment with Cation and Enzyme Prior to Application of Protein/Hydrocolloid (Aqueous) Batter Raw Russet Burbank potatoes were washed, peeled, then cut into ⅜ inch strips for French fry shape-about 3/16 (0.18) inch square cross-section and from about 2.5 to about 4 inches in length. After rinsing, approximately 507 grams of these potato strips were pre-treated by soaking in a solution consisting of 1,000 g water (43° C. (110° F.)), 5 g amylase (American Labs, Inc., Dry Bacterial Amylase-60,000 BAU/gram lot #15175-04), and 2 g anhydrous Calcium Chloride (Alfa Aesar, A Johnson Mattey Company, Ward Hill, Me., Stock # 12316) for three minutes. The pre-treated potato strips were then blanched for 2½ minutes in water at 93° C. (200° F.). After blanching, the potato strips were drained and placed in an impingement oven (Impinger® I, Model # 1240 from Lincoln Food Service Products, Inc., Fort Wayne, Ind.) and dried for 5 minutes at 135° C. (275° F.) with a moisture loss of 163.66 g. Partially dehydrated potato strips were then coated with a batter consisting of 88% water, 10.9% Wheat Protein (Arise™ Wheat Protein Isolate, Lot # 7092, MGP Ingredients, Atchison, Kans.), 0.6% High Ester pectin (Grindsted® AMD 783, Danisco Food Ingredients, lot # 41P088), and 0.50% of calcium chloride solution (32% solution Calcium Chloride from DSM Food Specialties). After coating, the potato strips were then further dried in the impingement oven for 5 minutes at 135° C. (275° F.). After cooling the prepared french fries were stored in the freezer, final weight was 251.31 g.

Fries were subsequently taken out of the freezer and fried in canola oil at 176° C. (350° F.) for 1 min 30 seconds and resulted in a fat content of 4.6%, and a final moisture content of 54.9%. Evaluation by sensory professionals determined samples to have an even, golden color, a crisp texture, and a pleasant fried potato flavor.

Example 2—French Fries

No Pretreatment before Application of Aqueous Protein/Hydrocolloid/Pre-gel Rice Flour Batter Raw Russet Burbank potatoes were washed, peeled, then cut into ⅜ inch strips for a french fry shape of about 3/16 (0.18) inch square in cross-section and from about 2.5 to about 4 inches in length. After rinsing, approximately 408 g of these potato strips were blanched for 2½ minutes in water at 93° C. (200° F.). After blanching, the potato strips were drained and placed in an impingement oven (Impinger® I, Model # 1240 from Lincoln Food Service Products, Inc., Fort Wayne, Ind.) and dried for 7 minutes at 135° C. (275° F.) with a moisture loss of 133.44 grams. Partially dehydrated potato strips were then coated with an aqueous adhesion mixture consisting of 82.5% water, 10.2% Wheat Protein (Arise™ Wheat Protein Isolate, Lot # 7092, MGP Ingredients, Atchison, Kans.), 4.62% Pre-gelatinized Rice Flour (Pac Star®, PGP International, Woodland, Calif.), 2.12% calcium chloride solution (32% solution Calcium Chloride from DSM Food Specialties), and 0.56% High Ester pectin (Grindsted® AMD 783, Danisco, lot # 41 P088). After coating with the batter, the potato strips were then further dried in an impingement oven for 7 minutes at 135° C. (275° F.). After cooling the prepared french fries were stored in the freezer, final weight was 181.6 grams.

Fries were subsequently taken out of the freezer and fried in canola oil, 176° C. (350° F.) for 1 minute and resulted in fries having a fat content of 2.7% and a final moisture content of 51.0%. Evaluation by sensory professionals determined samples to have a golden color, a crisp texture, and a pleasant fried potato flavor.

Example 3—French Fries

Pre-treatment with Enzyme/Cation Solution, Coated with Aqueous Protein/Hydrocolloid Barrier, Dusted with Rice Flour Raw Russet Burbank potatoes were washed, peeled, then cut into ⅜ inch strips for a french fry shape of about 3/16 (0.18) inch square in cross-section and from about 2.5 to about 4 inches in length. After rinsing, approximately 501 g of these potato strips were pre-treated by soaking in a solution consisting of 1,000 g water (43° C. (110° F.)), 5 g amylase (American Labs, Inc. Dry Bacterial Amylase-60, 000 BAU/gram lot #15175-04), and 2 g anhydrous Calcium chloride (Alfa Aesar, A Johnson Mattey Company, Ward Hill, Me., Stock # 12316) for three minutes. The pre-treated potato strips were then blanched for 2½ minutes in 93° C. (200° F.) water. After blanching, the potato strips were drained and placed in an impingement oven (Impinger® I, Model # 1240 from Lincoln Food Service Products, Inc., Fort Wayne, Ind.) and dried for 5 minutes at 135° C. (275° F.) with a moisture loss of 160.82 grams.

Partially dehydrated potato strips were then coated with a batter consisting of 88% water, 10.9% Wheat Protein (Arise™ Wheat Protein Isolate, Lot # 7092, MGP Ingredients, Atchison, Kans.), 0.6% High Ester pectin (Grindsted® AMD 783, Danisco, lot # 41P088) and 0.50% of calcium chloride solution (32% solution Calcium Chloride from DSM Food Specialties). After coating, a fine dusting of pre-gelatinized rice flour (Pac Star®, PGP International, Woodland, Calif.) was applied to the surface of the coating. The coated/dusted potato strips were then further dried in the impingement oven for 5 minutes at 135° C. (275° F.). After cooling the prepared french fries were stored in the freezer, final weight was 300.62 grams.

Fries were subsequently taken out of the freezer and fried in canola oil, 176° C. (350° F.) for 1 min 45 seconds and resulted in a fat content of 6.8%, and a final moisture content of 50.4%. Evaluation by sensory professionals determined samples to have an even, golden color, a crisp texture, and a pleasant fried potato flavor.

Example 4—French Fries

No Pre-treatment with Enzymes, Blanched in Water Containing Calcium Chloride, Coated with Aqueous Protein/Hydrocolloid Barrier, Dusted with Repel™ a (Modified Wheat Starch)

Raw Russet Burbank potatoes were washed, peeled, then cut into ⅜ inch strips for a french fry shape of about 3/16 (0.18) inch square in cross-section and from about 2.5 to about 4 inches in length. After rinsing, approximately 200 g of these potato strips were blanched for 1 minute in 93° C. (200° F.) water containing 5% calcium chloride. After blanching, the potato strips were drained and coated with a batter consisting of 89.5% water, 10.0% Wheat Protein (Arise™ Wheat Protein Isolate, Lot # 7092, MGP Ingredients, Atchison, Kans.), 0.5% High Ester pectin (Grindsted® AMD 783, Danisco, lot # 41 P088), and 0.45% of calcium chloride solution (32% solution Calcium Chloride from DSM Food Specialties). After coating, a fine dusting of modified wheat starch (Repel™ A MGP Ingredients, Atchison, Kans.) was applied to the surface of the coating. The coated/dusted potato strips were then dried in the impingement oven for 12 minutes at 146° C. (295° F.). After cooling the prepared french fries were stored in the freezer, final weight was 144.75 grams.

Fries were subsequently taken out of the freezer and fried in canola oil, 182° C. (360° F.) for 1 min 30 seconds and resulted in a fat content of 7.2%. Evaluation by sensory professionals determined samples to have an even, golden color, a crisp texture, and a pleasant fried potato flavor.

Example 5—French Fries

Pre-treatment with Enzyme/Cation Solution, Coated with Dry Protein/Hydrocolloid Blend to Create a Film Utilizing Moisture from the Potato, and Decrease Moisture in Potato Raw Russet Burbank potatoes were washed, peeled, then cut into ⅜ inch strips for a french fry shape of about 3/16 (0.18) inch square in cross-section and from about 2.5 to about 4 inches in length. After rinsing, approximately 415 g of these potato strips were pre-treated by soaking in a solution consisting of 1,000 g water (43° C. (110° F.)), 5 g amylase (American Labs, Inc. Bacterial Amylase-60,000 BAU/gram lot #15175-04), and 2 g anhydrous calcium chloride (Alfa Aesar, A Johnson Mattey Company, Ward Hill, Me., Stock # 12316) for three minutes. The pre-treated potato strips were then blanched for 2½ minutes in 93° C. (200° F.) water. After blanching, the potato strips were drained and placed in an impingement oven (Impinger® I, Model # 1240 from Lincoln Food Service Products, Inc., Fort Wayne, Ind.) and dried for 3 minutes at 135° C. (275° F.), with a moisture loss of 96 grams. After partial dehydration, the potato strips were coated with a dry blend consisting of 91.0% wheat protein (Arise™ Wheat Protein Isolate, Lot # 7092, MGP Ingredients, Atchison, Kans.) and 9.0% High Ester pectin (Grindsted® AMD 783, Danisco Food Ingredients, lot # 41 P088) on a dry weight basis. Approximately 15 grams of the dry blend was used for the coating. Coated potato strips were then dried in the impingement oven for 7 minutes at 135° C. (275° F.), then frozen. Final weight after freezing was 193.5 grams.

Fries were subsequently taken out of the freezer and fried in canola oil, 176 ° C. (350° F.) for 1 min 30 seconds, which resulted in a fat content of 5.9%, and a final moisture content of 45.1%. Evaluation by sensory professionals determined that the samples have a golden color, a crisp texture and a pleasant fried potato flavor.

Example 6—French Fries

Pre-treated with Enzyme/Cation Solution, Steam Blanched, Dried, Dusted with Rice Flour, Coated with Aqueous Protein/Hydrocolloid Barrier, Flash Fried, Frozen Raw Russet Burbank potatoes were washed, peeled, then cut into ⅜ inch strips for a french fry shape of about 3/16

(0.18) inch square in cross-section and from about 2.5 to about 4 inches in length. After rinsing, approximately 1500 g of these potato strips were pre-treated by soaking in a solution consisting of 3,000 g water 43° C. (110° F.), 15 g amylase (American Labs, Inc. Dry Bacterial Amylase-60, 000 BAU/gram lot #15175-04), and 18 g liquid calcium chloride (32% solution Calcium Chloride from DSM Food Specialties) for three minutes. The pre-treated potato strips were then steam blanched for 2 minutes in a M-6 Dixie Vegetable Blancher/Cooler (Dixie Canning Company, Athens Ga., 30603). After blanching, the potato strips were placed in an impingement oven (Impinger® I Model # 1240 from Lincoln Food Service Products, Inc., Fort Wayne, Ind.) and dried for 5 minutes at 163° C. (325° F.) with a moisture loss of 548.8 grams. Partially dehydrated potato strips were then dusted with a thin layer of pre-gelatinized rice flour (Pac Star®, PGP International, Woodland, Calif.), approximately 70 grams total pickup. These partially dried rice flour coated strips were then coated with a batter consisting of 2200 g water, 250 g Rice Protein N70 (RemyPro) plus 25 g of High Ester pectin (Grindsted® AMD 783, Danisco, lot # 41 P088), and 5 g of calcium chloride solution (32% solution Calcium Chloride from DSM Food Specialties) diluted with an additional 50 g of water. The batter was applied at approximately 7.5% pickup or application rate. Immediately after coating, the battered potato strips were fried for 15 seconds in 375° F. canola oil in a commercial fryer. After draining, the fries were immediately placed in the freezer and later weighed and bagged. The final weight was 900.4 g.

The following day, the fries were fried in canola oil, 176° C. (350° F.) for 1 minute. Evaluation by sensory professionals determined samples to have an even, golden color, a crisp texture, and a pleasant fried potato flavor.

Example 7—Hash Brown Squares

Pre-treated with Enzymes/Cations, Steam Blanched, Dusted with Rice Flour, Coated with Aqueous Protein/Hydrocolloid Barrier, Flash Fried, Frozen Raw Russet Burbank potatoes were washed, peeled, then chopped into small ⅛ inch pieces. After rinsing, approximately 2000 g of these potato pieces were pre-treated by soaking in a solution consisting of 3,000 g water (43° C./110° F.), 15 g amylase (American Labs, Inc. Dry Bacterial Amylase-60,000 BAU/gram lot #15175-04), and 18 g liquid calcium chloride (32% solution Calcium Chloride from DSM Food Specialties) for three minutes. The pre-treated potato pieces were then steam blanched for 45 seconds in an M-6 Dixie Vegetable Blancher/Cooler (Dixie Canning Company, Athens Ga., 30603). After blanching, the potato pieces were mixed with approximately 100 g of pre-gelatinized rice flour (Pac Star®, PGP International, Woodland, Calif.). The mixture was pressed into a flat sheet approximately ½ inch thick and subsequently divided into bars approximately 2½ inches wide by 3 inches long. These bars were placed in an impingement oven (Impinger® I, Model # 1240 from Lincoln Food Service Products, Inc., Fort Wayne, Ind.) and dried for 5 minutes at 162° C. (325° F.) with a moisture loss of 285 grams. The potato bars were then dusted with a thin layer of pre-gelatinized rice flour (Pac Star®, PGP International, Woodland, Calif.), approximately 57 g total pickup. The potato bars were then coated with a batter consisting of 2200 g water, 250 g Rice Protein N70 (RemyPro) plus 25 g of High Ester pectin (Grindsted® AMD 783, Danisco, lot # 41 P088), and 5 g of calcium chloride solution (32% solution Calcium Chloride from DSM Food Specialties) diluted with an additional 50 grams of water. The batter was applied at approximately 7.5% pickup or application rate. Immediately after coating, the battered potato bars were fried for 15 seconds in 375° F. canola oil in a commercial fryer. After draining, the potato bars were immediately placed in the freezer and later weighed and bagged. The final weight was 1600 g.

The following day, the hash brown squares were fried in canola oil, 176° C. (350° F.) for 1½ minutes. Evaluation by sensory professionals determined samples to have an even, golden color, a crisp texture, and a pleasant fried potato flavor.

Example 8—Chicken Strip Trial

Steamed Chicken Breast Strips Dusted with Rice Flour, Coated with Aqueous Protein/Hydrocolloid Barrier, Flash Fried, Frozen Approximately 1000 grams of chicken breast strips were cut from raw chicken breast pieces, then steamed for 10 minutes to completely cook. These chicken strips were then placed in an impingement oven (Impinger® I, Model # 1240 from Lincoln Food Service Products, Inc., Fort Wayne, Ind.) and dried for 5 minutes at 163° C. (325° F.) with a moisture loss of 125.8 grams. After drying, the chicken strips were then dusted with a thin layer of pre-gelatinized rice flour (Pac Star®, PGP International, Woodland, Calif.), approximately 110 grams total pickup. These cooked and rice flour-coated chicken strips were then coated with a batter consisting of 2250 g water, 250 g Rice Protein N70 (RemyPro) plus 25 g of High Ester pectin (Grindsted® AMD 783, Danisco, lot # 41 P088), 50 g of pregelatinized rice flour, and 5 g of calcium chloride solution (32% solution Calcium Chloride from DSM Food Specialties) diluted with an additional 50 grams of water. The batter was applied at approximately 10.0% pickup or application rate. Immediately after coating, the battered chicken strips were fried for 15 seconds in 375° F. canola oil in a commercial fryer. After draining, the chicken strips were immediately placed in the freezer and later weighed and bagged. The final weight was 859.0 g.

The following day, the chicken strips were fried in canola oil, 176° C. (350° F.) for 2 minutes. Evaluation by sensory professionals determined samples to have an even, golden color, a crisp texture, moist chicken meat center, and a pleasant fried chicken flavor.

While the invention has been described in conjunction with specific embodiments thereof, it is evident that many alternatives, modifications and variations in the coated, reduced-fat food products of the present invention, as well as the methods of preparing them, will be apparent to those skilled in the art in light of the foregoing description. Accordingly, it is intended to include all such alternatives, modifications and variations as set forth within the spirit and scope of the appended claims.

What is claimed:
1. A method of making a coated food product, comprising the steps of:
  (a) providing a plurality of food pieces; and
  (b) applying a coating to the food pieces, the coating including:
    a batter or breading, and
    an aqueous adhesion mixture comprising an effective amount of up to about 30% by weight of a protein consisting essentially of one or more vegetable proteins, a hydrocolloid, and one or more cations;

wherein the aqueous adhesion mixture comprises an effective amount of up to about 5% by weight of the hydrocolloid and an effective amount of up to about 10% by weight of the one or more cations, wherein the aqueous adhesion mixture has a solids content of up to about 20% by weight of the hydrocolloid and at least about 80% by weight of the protein, and wherein the hydrocolloid, the protein, and the one or more cations are present in amounts sufficient so that the hydrocolloid, the one or more cations, and the protein form a protein-hydrocolloid matrix that is stabilized and that provides a barrier to oil absorption into the food pieces.

2. The method of claim 1, wherein the aqueous adhesion mixture further comprises an oil absorption minimizing agent comprising an edible lipophobic material.

3. The method of claim 2, wherein the oil absorption minimizing agent is applied before the aqueous adhesion mixture.

4. The method of claim 2, wherein the oil absorption minimizing agent is applied after the aqueous adhesion mixture.

5. The method of claim 2, wherein the oil absorption minimizing agent is applied simultaneously with the aqueous adhesion mixture.

6. The method of claim 1, wherein the hydrocolloid comprises at least one member independently selected from the group consisting of pectins, gelatins, starches, gums, alginates, cellulose polymers and polyvinyl alcohol.

7. The method of claim 1, wherein the aqueous adhesion mixture comprises from about 65 to about 95% by weight water, from about 4 to about 25% by weight protein, from about 0.01% to about 1% of the one or more cations, and an effective amount of from about 0 to about 2% by weight hydrocolloid.

8. The method of claim 1, wherein the aqueous adhesion mixture further comprises one or more additives each independently selected from the group consisting of, one or more leavening agents, one or more colorants, one or more flavoring agents, one or more antioxidants, and one or more antimicrobials.

9. The method of claim 2, wherein the oil absorption minimizing agent comprises at least one member independently selected from the group consisting of rice flour, rice starch, potato flour, wheat starch, oat flour, oat starch, corn flour, corn starch, and tapioca starch.

10. The method of claim 2, wherein the oil absorption minimizing agent comprises pre-gelatinized rice flour.

11. The method of claim 10, wherein the pre-gelatinized rice flour is coated on the food pieces in an amount of about 0.5% by weight to about 5% by weight of the coated food product.

12. The method of claim 1, further comprising mixing the batter or breading into the aqueous adhesion mixture prior to applying the coating.

13. The method of claim 1, wherein applying the coating comprises applying a layer of the batter or breading to the food pieces, followed by applying the aqueous adhesion mixture on top of the layer of the batter or breading.

14. The method of claim 1, wherein applying the coating comprises applying a layer of the aqueous adhesion mixture, followed by applying the batter or breading on top of the layer of the aqueous adhesion mixture.

15. The method of claim 1, wherein the plurality of food pieces comprise at least one of cheese pieces or meat pieces including at least one of fish pieces, poultry pieces, beef pieces, pork pieces, or lamb pieces.

16. The method of claim 1, wherein the plurality of food pieces comprise at least one of:
chicken strips, chicken nuggets, chicken patties, fried chicken, fish pieces filets, fish nuggets, steak pieces, fruit pieces, vegetable pieces, fried egg products, cheese products, donuts, and toaster pastries.

17. The method of claim 1, further comprising:
after step (b), (c) drying the coated food pieces to remove moisture; and
after step (c), (d) freezing the dried food pieces.

18. The method of claim 1, wherein the coated food pieces are subsequently cooked by at least one method independently selected from the group consisting of microwaving, baking, and frying.

19. A food product made according to the method of claim 1.

20. A food product made according to the method of claim 17.

21. The method of claim 1, wherein the one or more vegetable proteins comprise at least one of: one or more rice proteins, one or more corn proteins, one or more soy proteins, and one or more wheat proteins.

* * * * *

UNITED STATES PATENT AND TRADEMARK OFFICE
CERTIFICATE OF CORRECTION

Page 1 of 2

PATENT NO.       : 9,894,918 B2
APPLICATION NO.  : 14/613577
DATED            : February 20, 2018
INVENTOR(S)      : Ashourian et al.

It is certified that error appears in the above-identified patent and that said Letters Patent is hereby corrected as shown below:

On the Title Page

On page 2, in Column 1, item (56) under "Other Publications", Line 5, before "filed", insert --Response--

On page 2, in Column 1, item (56) under "Other Publications", Line 7, before "filed", insert --Response--

On page 2, in Column 1, item (56) under "Other Publications", Line 9, before "filed", insert --Response--

On page 2, in Column 1, item (56) under "Other Publications", Line 11, before "filed", insert --Response--

On page 2, in Column 1, item (56) under "Other Publications", Line 48, delete "2008-5344681," and insert --2008-534681,-- therefor On page 2, in Column 1, item (56) under "Other Publications", Line 52, delete "2008/534681," and insert --2008-534681,-- therefor On page 2, in Column 2, item (56) under "Other Publications", Line 13, delete "irst" and insert --First-- therefor On page 2, in Column 2, item (56) under "Other Publications", Line 26, delete "Ca 2+-Induced" and insert --$Ca^{2+}$-Induced-- therefor On page 2, in Column 2, item (56) under "Other Publications", Line 66, before "filed", insert --Response--

Signed and Sealed this
Second Day of July, 2019

Andrei Iancu
*Director of the United States Patent and Trademark Office*

On page 3, in Column 1, item (56) under "Other Publications", Line 6, after "Amendment", insert --filed--

On page 3, in Column 1, item (56) under "Other Publications", Line 24, delete "14/816/784, filed Sep 13, 2016" and insert --14/816,784, Response filed Sep. 12, 2016-- therefor